3,151,145
METHODS FOR PREPARING S-ALKYL-O-ARYL-THIOLCARBONATES
Daniel W. Grisley, Jr., Dayton, Ohio, assignor to Monsanto Company, a corporation of Delaware
No Drawing. Filed Dec. 7, 1959, Ser. No. 857,505
5 Claims. (Cl. 260—455)

This invention relates to substituted-thiolcarbonates. In one aspect, this invention relates to methods for preparing the S-alkyl-O-aryl-thiolcarbonates from the aryloxide salts, carbonyl sulfide and an alkylating agent.

The substituted thiolcarbonates are an important class of compounds, being useful as intermediates in the preparation of other valuable substances, as well as for themselves as plasticizing and modifying agents for synthetic and natural rubbers, resins, and other polymeric materials, and as biological toxicants, particularly as nematocides. Several methods for formation of the substituted thiolcarbonates are known; for example, by reaction of a phenol with an alkyl chlorothiolcarbonate. Unfortunately, the alkyl chlorothiolcarbonate must first be formed from phosgene and a suitable mercaptan and the mercaptan may have to be synthetically prepared prior to reaction with the phosgene. Obviously, it would be highly advantageous to possess a process wherein the substituted thiolcarbonate is prepared directly in a simple manner from readily available reactants instead of having to prepare the thiolcarbonate in an indirect manner requiring several distinctly different reaction systems.

I have now discovered a process for the preparation of the substituted thiolcarbonates in a simple and direct manner from a phenol, carbonyl sulfide, and an alkylating agent.

An object of this invention is to prepare substituted thiolcarbonates in a simple and direct manner from readily available reactants.

Another object of this invention is to provide a novel method for the preparation of the substituted thiolcarbonates.

Another object of this invention is to prepare the substituted thiolcarbonates by the interaction of phenols with carbonyl sulfide followed by alkylating with an alkylating agent.

Other aspects, objects and advantages of this invention are apparent from a consideration of the accompanying disclosure and the appended claims.

According to the present invention, aryloxide salts are interacted with carbonyl sulfide under anhydrous conditions to form a thiolcarbonate salt as illustrated by the following equation:

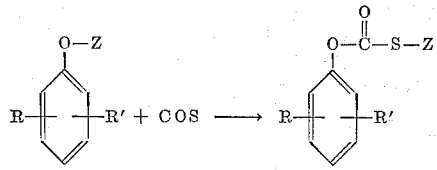

wherein R is selected from the group consisting of hydrogen and alkyl radicals, R' is selected from the group consisting of hydrogen, alkyl and alkaryloxide salt, R and R' being either the same or different when R and R' are hydrogen or alkyl, and Z is a salt-forming cation selected from the group consisting of alkali metal, alkaline earth metal and quaternary ammonium cations. The resulting thiolcarbonate salt is then interacted with an alkylating agent to form the substituted thiolcarbonate as illustrated by the following equation:

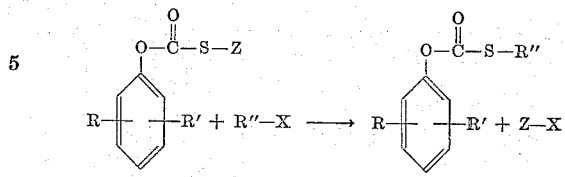

wherein R" is selected from the group consisting of alkyl and aralkyl radicals and X is a replaceable substituent.

The aryloxide salt reactants employed in the process of this invention are preferably the alkali metal, alkaline earth metal, or quaternary ammonium phenoxides of the formula

wherein Z is represented by the alkali metal, alkaline earth metal, or quaternary ammonium cation. The useful alkali metals are sodium, potassium, and lithium, whereas the useful alkaline earth cations include magnesium, calcium, barium and strontium. Examples of the quaternary ammonium cations include tetramethyl ammonium and trimethylbenzyl ammonium cations obtained from the corresponding hydroxides. Preferably, the salt-forming cation is an alkali metal because the alkaline earth and quaternary ammonium cations produce products which are not so readily separated as the products formed using the alkali metal cations. In the general formula, R of the aryloxide salt reactant can be either hydrogen or an alkyl radical and R' can be either hydrogen, an alkyl or an alkaryloxide salt group. Preferably, the alkyl radicals have less than 12 carbon atoms. Examples of suitable alkyl radicals include methyl, ethyl, propyl, isopropyl, butyl, pentyl, hexyl, octyl, nonyl, and the like. The alkylene group of the alkaryloxide radicals preferably have from 3 to 8 carbon atoms of either a straight chain or branched-chain configuration and preferably is a methylene group disubstituted with methyl radicals. The alkali metal, alkaline earth metal, or quaternary ammonium salt group is associated with the oxide group attached to the aromatic ring in positions ortho, meta, or para to the alkylene group and preferably is located in the para position. In addition, the aromatic ring can also be substituted with alkyl groups on the remaining carbon atoms. Thus, where R' is an alkaryloxide salt group, the aryloxide salt reactant has the formula $$\begin{array}{c} O-Z \\ R\text{---}\!\!\bigcirc\!\!\text{---}R''' \\ \phantom{R---}R''''\text{---}\!\!\bigcirc\!\!\text{---}O-Z \end{array}$$

where R''' is an alkylene group of from 3 to 18 carbon atoms, and R'''' is hydrogen or an alkyl group of less than 12 carbon atoms. Examples of some alkaryloxide salt substituted aryloxide salt reactants include 2,2'-bis(p-sodium phenoxide)propane
2,2'-bis(m-magnesium phenoxide)hexane
1,3-bis(o-quaternary ammonium phenoxide)butane A preferred aryloxide salt reactant is sodium phenoxide.

Methods for the preparation of the aryloxide salts are well known to those skilled in the art. For example, the sodium phenoxide can be readily prepared by heating a mixture of sodium and phenol in a dry atmosphere in the presence of a solvent such as diethyl Carbitol until the sodium has completed reacted.

The alkylating agent, R″—X, can be either an alkyl or an aralkyl alkylating agent having a replaceable substituent represented by X. Suitable replaceable substituents include the halides, such as, chloride, bromide, or iodide; the sulfates; or the sulfonates. Preferably, the alkyl and aralkyl radicals contain less than 14 carbon atoms; however, alkyl and aralkyl radicals having more than 14 carbon atoms can also be used since the reaction of this invention is not dependent upon the number of carbon atoms in these radicals but is determined solely by the nature of the functional groups. Examples of suitable alkylating agents include methyl iodide, propyl chloride, hexyl bromide, methyl sulfate, nonyl sulfate, benzyl sulfate, and the like. Methyl iodide is a preferred alkylating agent.

Reaction of the aryloxide salt with the carbonyl sulfide to form the thiolcarbonate takes place by merely bubbling the gaseous carbonyl sulfide into a solvent solution containing the aryloxide salt without the necessity for using elevated temperatures, elevated pressures, or catalysts. However, the reaction time required at room temperature is rather long so that usually elevated pressures and temperatures are used in order to obtain more suitable reaction times and higher yields. In general, the temperature is maintained within the range of from room temperature, i.e., 25° C. up to approximately 100° C. The use of temperatures much above 100° C. is not desirable since the thiolcarbonate salt is somewhat unstable at elevated temperatures. However, elevated pressures can be used with the higher temperatures in order to reduce the decomposition of the thiolcarbonate salt. Usually, the pressure is maintained at less than 100 p.s.i.g.; however, pressures as high as 200 p.s.i.g. or higher can be used if desired.

The reaction of the aryloxide salt with the carbonyl sulfide is ordinarily carried out in a solvent solution under anhydrous conditions. In carrying out this reaction, it is absolutely necessary that anhydrous conditions be maintained since the aryloxide salt reverts back to the phenol in the presence of carbonyl sulfide and water. For this reason, formation of the thiolcarbonate salt cannot be accomplished by reacting the carbonyl sulfide with sodium hydroxide and phenol instead of reacting the carbonyl sulfide with the aryloxide salt. The solvent used in this reaction is preferably one in which the aryloxide salt is soluble; however, it can less desirably be one in which the aryloxide salt is only partially soluble and some of the aryloxide salt is only suspended therein. Examples of some suitable solvents include diethyl Carbitol, dimethyl Carbitol, pyridine, and the like. The amount of solvent used in conducting the reaction is not critical so long as there is sufficient solvent to maintain most of the aryloxide salt in solution.

The aryloxide salt and the carbonyl sulfide are preferably reacted in approximately stoichiometric proportions; however, a moderate excess of either reactant could be used and usually an excess of the carbonyl sulfide is used. In the case of the alkaryloxide salt substituted aryloxide salt reactant, two equivalents of the alkylating agent are required in order to replace both of the alkali metal, alkaline metal or quaternary ammonium cations. It is not ordinarily desirable to use an excess of the aryloxide salt because the presence of an excess of this reactant in the reaction zone usually results in the formation of undesired side-reaction products.

The reaction of the aryloxide salt with the carbonyl sulfide is primarily an addition type reaction resulting in the formation of the thiolcarbonate salt as a single product. Advantageously, the substituted thiolcarbonate is formed by merely introducing the alkylating agent into the reaction mixture obtained from the reaction of the carbonyl sulfide with the aryloxide salt without employing a separation or purification step. Thus, the same reaction conditions are ordinarily used in the alkylation step as were used in the reaction of the carbonyl sulfide with the aryloxide salt. A catalyst is not required in either step and preferably the alkylating agent is present in a stoichiometric proportion; however, an excess of the alkylating agent is sometimes used. Ordinarily, the alkylation step is best conducted by merely introducing the alkylating agent into the reaction zone after suitable time has been allowed for reaction of the carbonyl sulfide with the aryloxide salt, usually after a period of from 15 to 30 minutes has expired.

The substituted thiolcarbonate product is very readily recovered from the reaction mixture, particularly when the reaction is conducted in a solvent medium in which the product is soluble. Any excess carbonyl sulfide is first vented from the reaction zone and any excess aryloxide salt removed by washing with water. The product is then recovered by the usual distillation procedures well known to those skilled in the art.

The substituted thiolcarbonate products of this invention are usually fairly low-boiling liquids which are generally insoluble in water but soluble in most organic solvents. Illustrative examples of some substituted thiocarbonate products formed in the process of this invention include:

S-methyl-O-phenylthiolcarbonate
S-methyl-O-m-tolylthiolcarbonate
S-butyl-O-phenylthiolcarbonate
S-isopropyl-O-xylylthiolcarbonate
S-benzyl-O-phenylthiolcarbonate
2,2′-bis(p-S-alkylthiolcarbonatophenyl)propane These substituted thiolcarbonates are particularly useful as nematocides. For example, both S-methyl-O-m-tolylthiolcarbonate and S-ethyl-O-m-tolylthiolcarbonate have been observed to kill from 95% to 100% of the nematodes in soil in a period of 24 hours when applied at a 0.1% concentration.

The advantages, the desirability and usefulness of the present invention are illustrated by the following examples.

*Example 1*

Sodium phenoxide was prepared by reacting 6.9 g. (0.3 mole) of sodium with 28.2 g. (0.3 mole) of phenol in 250 ml. of diethyl Carbitol solvent. These materials were mixed together and heated, with stirring, in a dry atmosphere until the sodium had been completed reacted. The sodium phenoxide obtained was placed in an autoclave containing 200 ml. of toluene and heated to 135° C. to remove 170 ml. of liquid as distillate from a distillation column attached to the autoclave. Thereafter, the autoclave was flushed with nitrogen, sealed and cooled to a temperature of 70° C. Carbonyl sulfide amounting to 48 g. (0.80 mole) was then pressured into the autoclave from a steel presure flask. The reaction mixture was then maintained at a temperature of 60–70° C. for a period of ½ hour. At the end of this time, 42.6 g. (0.3 mole) of methyl iodide was pressured into the reaction mixture in the autoclave at a pressure of 140 p.s.i.g. The mixture was then allowed to cool to room temperature with stirring.

Thereafter, the unreacted carbonyl sulfide in the autoclave was vented and 200 ml. of ether and 1000 ml. of water were added to the reaction mixture with the formation of two phases. The organic phase was separated from the water phase and washed 5 times with 500 ml. portions of water to remove any unreacted sodium phenoxide. After drying over magnesium sulfate, the organic phase was filtered and evaporated under reduced pressure to yield an oil. Fractionation of the oil resulted in the recovery of 10.6 g. of the S-methyl-O-phenyl thiolcarbonate boiling at 114.5–116° C./14 mm. The elemental analysis of this product was found to be 56.8 wt. percent carbon, 4.54 wt. percent hydrogen and 19.39 wt. percent sulfur as compared with calculated values of 57.12 wt. percent carbon, 4.79 wt. percent hydrogen and 19.06 wt. percent sulfur. The structure of the product was confirmed from an examination of the infrared spectrum.

*Example 2*

In this example, sodium phenoxide, prepared as in Example 1, and a solution of 0.3 mole of sodium phenoxide in 250 ml. of diethyl Carbitol was placed in an autoclave. After the autoclave was purged with nitrogen and sealed, 54.6 g. (0.9 mole) of carbonyl sulfide was pressured into the stirred mixture at a temperature of 53° C. and a pressure of 75 p.s.i.g. The reaction mixture was stirred for a period of 15 minutes, after which time 50 g. (0.35 mole) of methyl iodide was pressured into the autoclave at a temperature of 50–60° C. The reaction mixture was then allowed to cool to room temperature and the unreacted carbonyl sulfide removed by venting the autoclave. The reaction mixture was then removed from the autoclave and admixed with ether to obtain an organic phase which was washed with 5–300 ml. portions of water. After drying the organic phase with magnesium sulfate and filtering, the product was evaporated under reduced pressure to yield an oil. Distillation of the oil gave 19 g. of the S-methyl-O-phenyl thiolcarbonate boiling at 110–113° C./20 mm. The product was identified by inspection of the infrared spectrum.

Reasonable variation and modification of the invention as described are possible, the essence of which is that there have been provided methods for preparing the substituted thiolcarbonates in a simple and direct manner by interacting an aryloxide with carbonyl sulfide and alkylating the resulting product.

I claim:

1. The method which comprises reacting an aryloxide salt of the formula

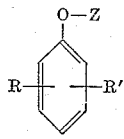

wherein R is selected from the group consisting of hydrogen and alkyl radicals containing less than 12 carbon atoms, R' is selected from the group consisting of hydrogen, alkyl containing less than 12 carbon atoms, and alkaryloxide salt, wherein the latter member of the group has the radical formula —Y—O—Z, where Y is the divalent radical

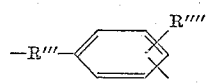

R''' is an alkylene group linking the two benzenoid rings and containing from 3 to 18 carbon atoms and R'''' is selected from the group consisting of hydrogen and alkyl radicals containing less than 12 carbon atoms and Z is a salt-forming cation selected from the group consisting of alkali metal, alkaline earth metal and quaternary ammonium cations, with carbonyl sulfide under anhydrous conditions in a solvent medium at a temperature in the range of 25° C. to 100° C. and a superatmospheric pressure less than 200 p.s.i.g. to form a first reaction mixture containing a thiolcarbonate salt of the formula

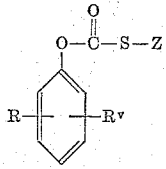

wherein $R^v$ is selected from the group consisting of hydrogen, alkyl containing less than 12 carbon atoms, and the radical $$-Y-O-\overset{O}{\underset{\|}{C}}-S-Z$$

and Y, R and Z are as above defined, alkylating said first reaction mixture at from about room temperature up to about 100° C. with an alkylating agent of the formula R''—X wherein R'' is selected from the group consisting of alkyl and aralkyl radicals containing less than 14 carbon atoms and X is a readily replaceable substituent selected from the group consisting of chloride, bromide, iodide, sulfate, and sulfonate to form a second reaction mixture containing a thiolcarbonate of the formula

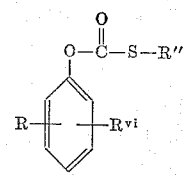

wherein $R^{vi}$ is selected from the group consisting of hydrogen, alkyl containing less than 12 carbon atoms and the radical $$-Y-O-\overset{O}{\underset{\|}{C}}-S-R''$$

and Y, R and R'' are as above defined, and recovering from said second reaction mixture said thiolcarbonate as product.

2. The method of claim 1 wherein R is the radical —$C_nH_{2n+1}$, where $n$ is a whole number from 0 to 11; R', $R^v$ and $R^{vi}$ are the radical —$C_xH_{2x+1}$, where $x$ is a whole number from 0 to 11; Z is an alkali metal; R'' is an alkyl radical; X is an iodide atom; and said alkylating is conducted by introducing the alkyl iodide alkylating agent directly into said first reaction mixture.

3. The method of claim 1 wherein R is the radical —$C_nH_{2n+1}$, where $n$ is a whole number from 0 to 11; R', $R^v$ and $R^{vi}$ are the radical —$C_xH_{2x+1}$, where $x$ is a whole number from 0 to 11; Z is an alkali metal; R'' is an alkyl radical; X is a bromide atom; and said alkylating is conducted by introducing the alkyl bromide alkylating agent directly into said first reaction mixture.

4. The method of claim 2 wherein Z is sodium, and said solvent medium is diethyl Carbitol.

5. The method comprising reacting sodium phenoxide dissolved in diethyl Carbitol with carbonyl sulfide under anhydrous conditions at a temperature in the range of 25° C. to 100° C. and a superatmospheric pressure less than 200 p.s.i.g., alkylating the resulting reaction mixture with methyl iodide under alkylating conditions of from about room temperature up to about 100° C., and recovering from the last resulting reaction mixture S-methyl-O-phenyl thiolcarbonate as product.

References Cited in the file of this patent

UNITED STATES PATENTS

| | | |
|---|---|---|
| 2,694,723 | Schramm | Nov. 16, 1954 |
| 2,696,496 | Craig et al. | Dec. 7, 1954 |

OTHER REFERENCES

Whitmore: "Organic Chemistry," second ed., 1951, page 455.

Meyer and Jacobson: "Lehrbuch der Organischen Chemie," vol. 2, second ed., 1913, pages 1364–1365.